(12) United States Patent
Guan

(10) Patent No.: US 8,165,084 B2
(45) Date of Patent: Apr. 24, 2012

(54) METHOD FOR USING AN EXTENDING SUPER-FRAME TO TRANSFER DATA IN A SHORT DISTANCE WIRELESS PERSONAL AREA NETWORK

(75) Inventor: Yong Guan, Beijing (CN)

(73) Assignee: Beijing Yudong Technology Development Ltd., Beijing (CN)

( * ) Notice: Subject to any disclaimer, the term of this patent is extended or adjusted under 35 U.S.C. 154(b) by 204 days.

(21) Appl. No.: 12/663,383

(22) PCT Filed: May 27, 2008

(86) PCT No.: PCT/CN2008/071091
§ 371 (c)(1),
(2), (4) Date: Apr. 8, 2010

(87) PCT Pub. No.: WO2008/151537
PCT Pub. Date: Dec. 18, 2008

(65) Prior Publication Data
US 2010/0202349 A1    Aug. 12, 2010

(30) Foreign Application Priority Data
Jun. 14, 2007 (CN) .......................... 2007 1 0118902

(51) Int. Cl.
*H04L 1/00* (2006.01)
(52) U.S. Cl. .................... 370/329; 370/345; 370/470
(58) Field of Classification Search .................. 370/329, 370/345, 470
See application file for complete search history.

(56) References Cited

U.S. PATENT DOCUMENTS

2009/0238160 A1*  9/2009  Bhatti et al. ................. 370/338
2010/0124238 A1*  5/2010  Hong et al. ................. 370/474

FOREIGN PATENT DOCUMENTS

| CN | 1859050 A | 11/2006 |
| CN | 1918859 A | 2/2007 |
| CN | 101068182 A | 11/2007 |
| WO | 2006049415 A1 | 5/2006 |

OTHER PUBLICATIONS

Ghulam Bhatti et al., 'Extending the MAC Superframe of 802.15.4 Spec', Project: IEEE P802.15 Working Group for Wireless Personal Area Networks, Aug. 20, 2008, pp. 1-19.*
International Search Report mailed Aug. 28, 2008 for PCT Application No. PCT/CN2008/071091, 4 pages.

* cited by examiner

*Primary Examiner* — Melvin Marcelo
(74) *Attorney, Agent, or Firm* — Turocy & Watson, LLP

(57) ABSTRACT

A method for using an extending super-frame to transfer data in a short distance wireless personal network is provided. Firstly, the super-frame segments, which are in an active period of a network coordinator are continuously copied to a whole inactive period of a current device, and an extending super-frame segments are obtained. Then, information is broadcasted to all general devices. The general device with a quality of service requirement send a service guarantee time slot bandwidth application to the network coordinator, and indicates in the application that the extending super-frame is required. When the application is granted, the super-frame segments, which are in the active period of the current device are copied to the whole inactive period, and the extending super-frame segments are obtained. Then, data is transmitted to the network coordinator with the extending super-frame segments.

4 Claims, 5 Drawing Sheets

| Bit: 0-3 | 4-7 | 8-11 | 12 | 13 | 14 | 15 |
|---|---|---|---|---|---|---|
| Beacon order | Super-frame order | Last CAP time interval | Battery life extension | Super-frame extension | PAN coordinator | Linkage permission |

FIG. 3

| Bit: 0-3 | 4 | 5 | 6 | 7 |
|---|---|---|---|---|
| GTS length | GTS direction | Type | Super-frame extension | Reservation |

FIG. 4

METHOD FOR USING AN EXTENDING SUPER-FRAME TO TRANSFER DATA IN A SHORT DISTANCE WIRELESS PERSONAL AREA NETWORK

CROSS-REFERENCE TO RELATED APPLICATION

This application is a US national stage filing of Patent Cooperation Treaty (PCT) Application Serial No. PCT/CN2008/071091 (WO 2008/151537), filed on May 27, 2008, which claims priority to Chinese Patent Application Serial No. 200710118902.5, filed on Jun. 14, 2007, the entireties of both of which are incorporated herein by reference.

BACKGROUND OF THE INVENTION

1. Field of the Invention

The present invention relates to a method for using an extending super-frame to transfer data in a short distance wireless personal area network (WPAN).

2. Description of the Prior Art

A wireless communication system that satisfies the requirements of a quality of service (QoS) and a property of saving energy for different applications are usually needed. The QoS mainly includes the requirements of a bandwidth, a packet loss rate, a delay, etc. Some medium access control protocols, based on a central control, use a reserved bandwidth technology, such as a Time Division Multiple Access (TDMA) and a Code Division Multiple Access (CDMA), to ensure bandwidth allocation and a certain delay. The property of saving the energy mainly includes a power consumption of a wireless transceiver system itself, and a ratio, i.e., a duty cycle of a workload, between an active period and an inactive period. A high-energy efficient device is usually in a dormant state when not transmitting data and has a small duty cycle. Since the small duty cycle of the workload causes a large delay, it is very hard for the wireless communication system to satisfy the requirements of the QoS and the property of saving the energy at the same time.

As illustrated in FIG. 1, a wireless personal area network (WPAN), which complies with an IEEE802.15.4-2006 standard, satisfies the requirements of the QoS and the property of saving the energy for various applications using a super-frame structure based on the central control. The service guarantee time slot (GTS), which is based on the TDMA technology, can satisfy the bandwidth and the delay requirements of the system in an active period, and can change a ratio between the active period and an inactive period by adjusting a super-frame order and a beacon order, thereby satisfying various properties of saving the energy. However, each general device in the WPAN uses the same super-frame structure as a coordinator, i.e., the same active period and the same inactive period. As such, the WPAN cannot satisfy the requirements of the property of saving the energy and the QoS, i.e., the delay and the bandwidth, at the same time.

SUMMARY OF THE INVENTION

Therefore, an object of the present invention is to provide a method that can overcome the aforesaid drawbacks of the prior art.

According to the present invention, a method for using an extending super-frame to transfer data in a short distance wireless personal area network (WPAN) comprises:

A) adding an extending super-frame parameter to a medium access control database of a WPAN standard;

B) defining a reserved bit in a super-frame definition field of the WPAN standard as a flag bit of the extending super-frame, and a reserved bit in a feature field of a service guarantee time slot of the WPAN standard as the flag bit of the extending super-frame;

C) setting a parameter of an idle receiver of a coordinator open and the extending super-frame parameter true;

D) copying a super-frame segment from an active period of the coordinator to an inactive period of the coordinator to obtain an extending super-frame segment;

E) broadcasting information of the coordinator using an extending super-frame to a plurality of general devices, the general device with a quality of service requirement applying a service guarantee time slot bandwidth to the coordinator through a service guarantee time slot application of the WPAN standard, and indicating in the service guarantee time slot application that the extending super-frame is required; and F) after the coordinator receives the service guarantee time slot application, the coordinator broadcasting information of an allocated bandwidth and information of using the extending super-frame to all of the general devices when there is enough bandwidth and when the extending super-frame is permitted for use, after the general device with the quality of service requirement receives the broadcasted information, setting the parameter of the idle receiver open and the extending super-frame parameter true when the service guarantee time slot bandwidth application is granted and when the coordinator uses the extending super-frame, copying a super-frame segment from an active period of a device to an inactive period to obtain an extending super-frame, and the device proceeding to a data communication with the coordinator through the extending super-frame, and when the service guarantee time slot bandwidth application is not granted, setting the extending super-frame parameter false.

The method for using the extending super-frame to transfer data in the WPAN has the following advantages:

(1) the WPAN satisfies both the requirements of a property of saving energy for an energy effective device and a QoS, i.e., the delay and the bandwidth of a device;

(2) management of the extending super-frame is simplified, and the compatibility between the devices is improved because all the structural properties of a super-frame segment is copied to an inactive period; and (3) a medium access control protocol based on an IEEE802.15.2006 standard is supplemented, and is fully compatible with an IEEE802.15.4-2006 standard.

BRIEF DESCRIPTION OF THE DRAWINGS

FIG. 3 shows a format of a super-frame definition field.

FIG. 4 shows a format of a service guarantee time slot (GTS) feature field.

DESCRIPTION OF THE PREFERRED EMBODIMENTS

Figure 1:
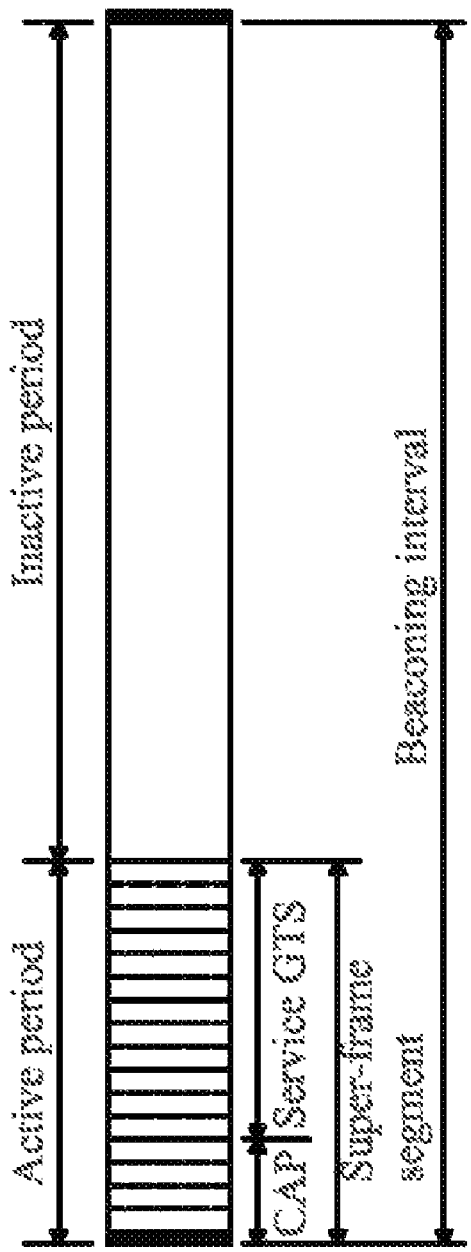
FIG. 1 is a structural diagram of a conventional super-frame in a short distance wireless personal area network (WPAN) based on an IEEE802.15.4-2006 standard.

It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "coupled," and variations thereof herein are used broadly and encompass direct and indirect connections, couplings, and mountings.

A method for using an extending super-frame in a short distance wireless personal area network (WPAN) is provided. Firstly, add an extending super-frame parameter to a medium access control database based on a IEEE802.15.4-2006 standard, and define a reserved thirteenth bit in a super-frame definition field based on the IEEE802.15.4-2006 standard as a flag bit of the extending super-frame, and a reserved sixth bit in a feature field of a service guarantee time slot (GTS) based on the IEEE802.15.4-2006 standard as the flag bit of the extending super-frame. Secondly, set a parameter of an idle receiver of a coordinator open and the extending super-frame parameter true, copy super-frame segments in an active period of the coordinator to an inactive period of the coordinator to obtain an extending super-frame segments, and broadcast information of the coordinator using the extending super-frame to a plurality of general devices. Thirdly, through a service guarantee time slot application in the IEEE802.15.4-2006 standard, the general device with a quality of service (QoS) requirement applies a service guarantee time slot bandwidth to the coordinator, and indicates in the service guarantee time slot application that the extending super-frame is required. After the coordinator receives the service guarantee time slot application from the general device with the quality of service requirement, the coordinator broadcasts information of an allocated bandwidth and information of using the extending super-frame to all of the general devices when there is enough bandwidth and when the extending super-frame is permitted for use. The coordinator broadcasts original information of the allocated bandwidth and information of not using the extending super-frame to all of the general devices when there is not enough bandwidth for allocation. After the general device with the quality of service requirement receives the broadcasted information, the coordinator sets the parameter of the idle receiver open and the extending super-frame parameter true when the service guarantee time slot bandwidth application is granted and when the coordinator uses the extending super-frame. The super-frame segments in an active period of a device is copied to an inactive period to obtain the extending super-frame. The device proceeds to a data communication with the coordinator through the extending super-frame. The extending super-frame is set to false when the service guarantee time slot bandwidth application is not granted. When the coordinator cancels use of the extending super-frame, set the extending super-frame parameter false, and broadcast information of cancellation of using the extending super-frame to all of the general devices. The extending super-frame parameter is set to false after the general device with the quality of service requirement receives the information of the cancellation of using the extending super-frame, and the use of the extending super-frame for the data communication with the coordinator is stopped.

The method is described hereinafter with reference to the accompanying drawings.

Firstly, add a Boolean extending super-frame parameter to the medium access control in the short distance WPAN based on the IEEE802.15.4-2006 standard. The parameter indicates whether the extending super-frame is used in the inactive period or not. The reserved 13th bit of the super-frame definition field based on the IEEE802.15.4-2006 standard is defined as the flag bit of the extending super-frame, as illustrated in FIG. 3. The flag bit represents whether the coordinator uses the extending super-frame or not. The reserved 6th bit in the feature field of the service guarantee time slot based on the IEEE802.15.4-2006 standard is defined as the flag bit of the extending super-frame, as illustrated in FIG. 4. The flag bit represents whether the general devices of the network use the extending super-frame or not.

Figure 2:
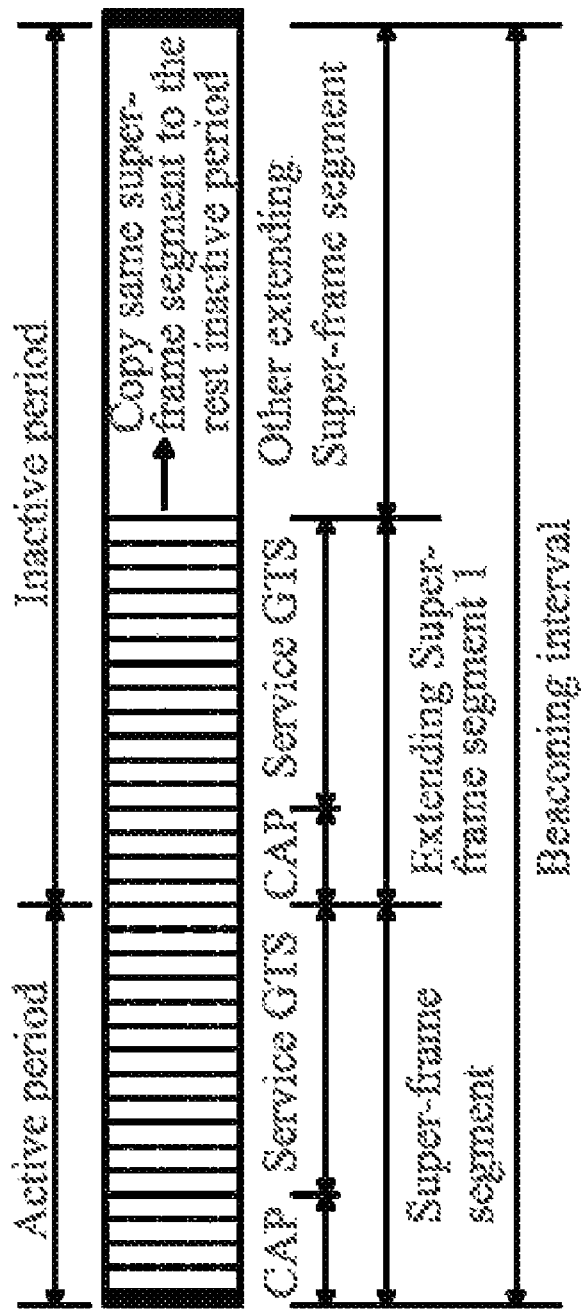
FIG. 2 is a structural diagram of a super-frame in a short distance WPAN according to the present invention.

The parameter of the idle receiver in the coordinator is set to open so that the idle receiver can receive data from the other general devices at any time. In order to use the extending super-frame, the extending super-frame parameter is set to true. After detecting that the extending super-frame parameter is true, the super-frame segments, which include the competitive access part (CAP) and the GTS, are continuously copied from the active period of the coordinator to the whole inactive period of the coordinator, and the extending super-frame segments are obtained. The structure of each extending super-frame is completely the same as that of the super-frame, as illustrated in FIG. 2. The number of the extending super-frame is determined by a ratio between a beacon order and a super-frame order. The coordinator extends a bit of the super-frame in a super-frame definition field of a beacon to 1, and broadcasts information of using the extending super-frame to all of the general devices.

The general device with the QoS requirement in the short distance WPAN applies a service guarantee time slot bandwidth to the coordinator using the service guarantee time slot bandwidth application based on the IEEE802.15.4-2006 standard, and extends a bit of the super-frame in the service GTS feature field of the service guarantee time slot bandwidth application to 1 so as to indicate that the extending super-frame is needed to satisfy the QoS.

After the coordinator in the short distance WPAN receives the service guarantee time slot bandwidth application from the general device with the quality of service requirement, the coordinator broadcasts information of an allocated bandwidth and information of using the extending super-frame to all of the general devices when there is enough bandwidth for allocation and when it is permitted to use the extending super-frame. Otherwise, the coordinator broadcasts original information of the allocated bandwidth and information of not using the extending super-frame to all of the general devices.

After the general device with the quality of service requirement receives the broadcasted information, the idle receiver parameter of a device is set to open and the extending super-frame parameter is set to true when it is notified that the service guarantee time slot bandwidth application is granted and the coordinator uses the extending super-frame. The super-frame segments in the active period of the device are continuously copied to the whole inactive period of the device to obtain the extending super-frame, and the device proceeds to a data communication with the coordinator through the extending super-frame. The extending super-frame is set to false when it is notified that the service guarantee time slot bandwidth application is not granted.

When the coordinator in the short distance WPAN uses the extending super-frame, the coordinator sets the extending super-frame parameter to false, and broadcasts information of cancellation of using the extending super-frame to all of the general devices. After receiving the information of the cancellation of using the extending super-frame, the general device with the quality of service requirement sets the extending super-frame parameter of the device false and stops using the extending super-frame for the data communication with the coordinator. If a single general device with the quality of service requirement simply wants to cancel use of the extending super-frame, the extending super-frame parameter of the device is set to false and the use of the extending super-frame for the data communication with the coordinator is stopped.

The preferred embodiment is described hereinafter.

In a real WPAN, which includes a coordinator, a high-energy efficiency device and a device with the quality of service requirement for an audio transmission, the properties are compared between the devices with the QoS requirement of the IEEE802.15.4-2006 standard and the present invention without any effect on the high-energy efficiency device.

Firstly, in order to ensure audio service quality, both the beacon order and the super-frame order are selected as 2 without the inactive period. After calculation, each time slot of the super-frame segment is approximately 4 ms, and the number of such time slots are sixteen. The CAP is assigned with four time slots, and the service guarantee time slot is divided into six groups with two time slots for each group. At the transfer rate of 250 Kbps, each group can satisfy a whole package of the audio transmission. The coordinator sends data to the devices with the quality of service requirement using the odd groups, and the devices sends data to the coordinator using the even groups. At this time, the maximum delay, which is 32 ms, i.e., equals to the time of the CAP plus two service guarantee time slots, can satisfy the requirements of a delay and a delay jitter, i.e., less than 100 ms, for an audio. The high-energy efficient device exchanges data with the coordinator through the CAP, and a duty cycle is very high because there is no inactive period.

To reduce the duty cycle of the high-energy efficient device, the inactive period must be added. The length of the inactive period is increased by keeping the super-frame order unchanged and by increasing the beacon order. When the beacon order is increased to 12, the duty cycle of the current high-energy efficient device is approximately one thousand, and the effect of saving the energy is obvious. However, when the beacon order is 12, the device with the quality of service requirement based on the IEEE802.15.4-2006 standard cannot proceed to an audio transmission for the delay because the inactive period has reached 65 seconds. In the present invention, since the device with the quality of service requirement copies the super-frame segments to the whole inactive period and communicates with the coordinator in the inactive period, the maximum delay is constant.

Figure 5:
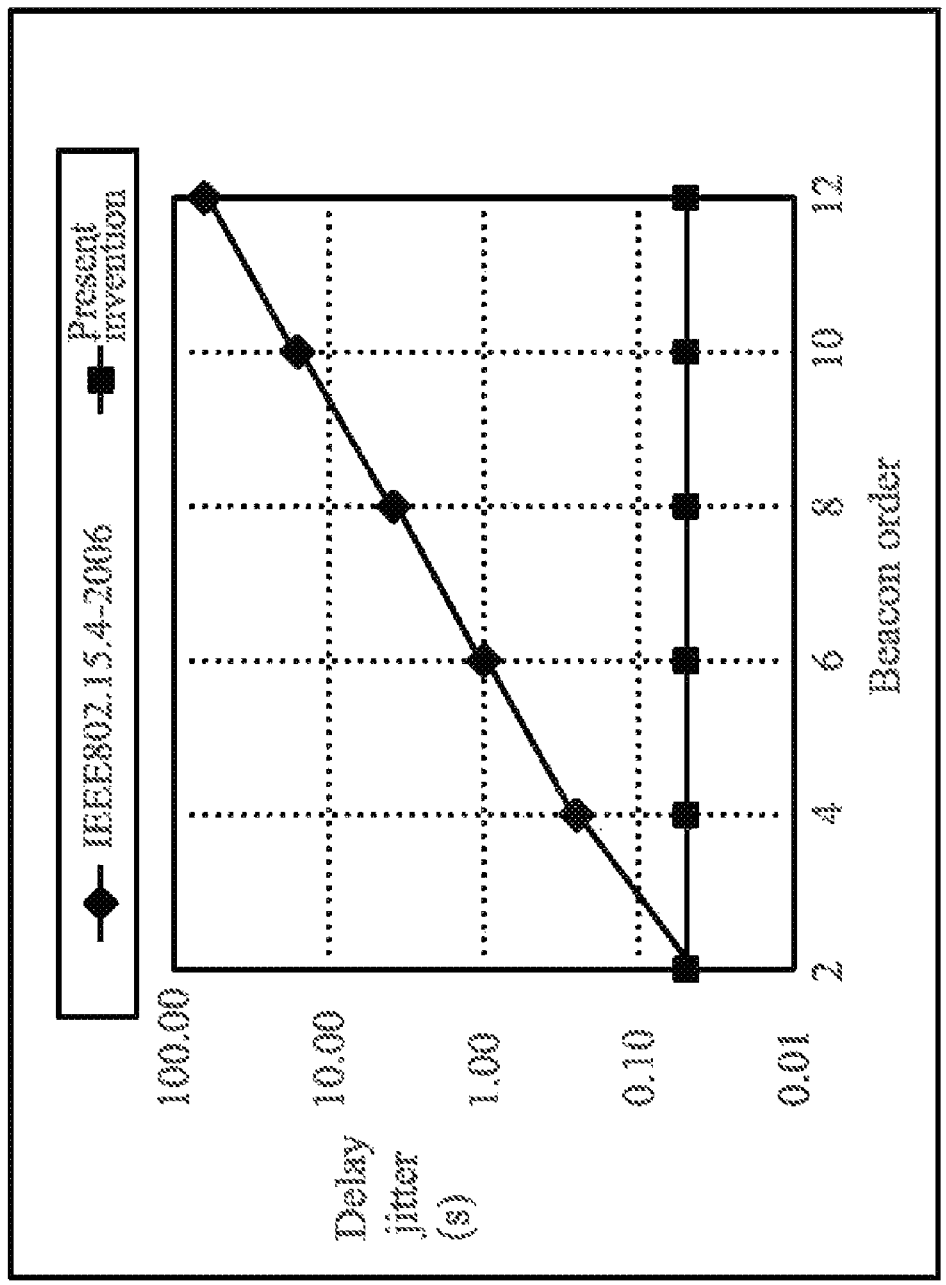
FIG. 5 shows a comparison between a performance of a delay jitter and a beacon order.

Referring to FIG. 5, in order to keep the super-frame order to 2, the length of the inactive period is increased by increasing the beacon order from 2 to 12 to achieve the corresponding curves of the delay properties according to the IEEE802.14.5-2006 standard. In FIG. 5, the horizontal coordinate represents the beacon order, and the vertical coordinate represents the delay. The curves show that the present invention can satisfy the requirements of saving the energy for the energy effective device and the quality of service, i.e. the delay and the bandwidth, for the device at the same time.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for using an extending super-frame to transfer data in a short distance wireless personal area network (WPAN), said method comprising:
A) adding an extending super-frame parameter to a medium access control database of a WPAN standard;
B) defining a reserved bit in a super-frame definition field of the WPAN standard as a flag bit of the extending super-frame, and a reserved bit in a feature field of a service guarantee time slot of the WPAN standard as the flag bit of the extending super-frame;
C) setting a parameter of an idle receiver of a coordinator open and the extending super-frame parameter true;
D) copying a super-frame segment from an active period of the coordinator to an inactive period of the coordinator to obtain an extending super-frame segment;
E) broadcasting information of the coordinator using an extending super-frame to a plurality of general devices, the general device with a quality of service requirement applying a service guarantee time slot bandwidth to the coordinator through a service guarantee time slot application of the WPAN standard, and indicating in the service guarantee time slot application that the extending super-frame is required; and
F) after the coordinator receives the service guarantee time slot application, the coordinator broadcasting information of an allocated bandwidth and information of using the extending super-frame to all of the general devices when there is enough bandwidth and when the extending super-frame is permitted for use,
after the general device with the quality of service requirement receives the broadcasted information, setting the parameter of the idle receiver open and the extending super-frame parameter true when the service guarantee time slot bandwidth application is granted and when the coordinator uses the extending super-frame, copying a super-frame segment from an active period of a device to an inactive period to obtain an extending super-frame, and the device proceeding to a data communication with the coordinator through the extending super-frame, and when the service guarantee time slot bandwidth application is not granted, setting the extending super-frame parameter false.

2. The method as claimed in claim 1, further comprising:
the coordinator broadcasting original information of the allocated bandwidth and information of not using the extending super-frame to all of the general devices when there is not enough bandwidth for allocation.

3. The method as claimed in claim 1, further comprising:
when the coordinator cancels use of the extending super-frame, setting the extending super-frame parameter false, and broadcasting information of cancellation of using the extending super-frame to all of the general devices,
after the general devices receives the information of the cancellation of using the extending super-frame, setting the extending super-frame parameter false and stopping from using the extending super-frame for the data communication with the coordinator.

4. The method as claimed in claim 1, wherein:
the WPAN standard is an IEEE 802.15.4-2006 standard;
in step A), the reserved bit in the super-frame definition field of the WPAN standard is the reserved thirteenth bit in the super-frame definition field of the WPAN standard; and
in step A), the reserved bit in the feature filed of the guarantee time slot of the WPAN standard is the reserved sixth in the feature field of the guarantee time slot of the WPAN standard.

* * * * *